(12) United States Patent
Schelling et al.

(10) Patent No.: US 7,784,485 B2
(45) Date of Patent: Aug. 31, 2010

(54) PLANT FOR STORING GAS UNDER PRESSURE

(75) Inventors: Jan Schelling, Porsgrunn (NO); Pål Kittilsen, Trondheim (NO); Sandra Hennie Nilsen, Porsgrunn (NO); Leif Kåre Grønstad, Sannidal (NO)

(73) Assignee: Norsk Hydro ASA, Oslo (NO)

( * ) Notice: Subject to any disclaimer, the term of this patent is extended or adjusted under 35 U.S.C. 154(b) by 365 days.

(21) Appl. No.: 11/795,503

(22) PCT Filed: Feb. 17, 2006

(86) PCT No.: PCT/NO2006/000067

§ 371 (c)(1),
(2), (4) Date: Jul. 18, 2007

(87) PCT Pub. No.: WO2006/088378

PCT Pub. Date: Aug. 24, 2006

(65) Prior Publication Data

US 2008/0149643 A1    Jun. 26, 2008

(30) Foreign Application Priority Data

Feb. 21, 2005   (NO) ................................. 20050911

(51) Int. Cl.
*B65D 88/76*    (2006.01)
*F17C 1/00*     (2006.01)

(52) U.S. Cl. ..................... 137/266; 137/264; 137/236.1

(58) Field of Classification Search ............. 137/236.1, 137/255, 256, 259, 266, 264; 220/567.1
See application file for complete search history.

(56) References Cited

U.S. PATENT DOCUMENTS

| | | | | |
|---|---|---|---|---|
| 2,740,259 A | * | 4/1956 | Westlund | ..................... 137/264 |
| 2,814,406 A | | 11/1957 | Marancik | |
| 3,040,767 A | * | 6/1962 | Quenard | ..................... 137/259 |
| 3,658,080 A | * | 4/1972 | Mitchell | ..................... 137/264 |
| 4,638,920 A | | 1/1987 | Goodhues, Jr. | |

FOREIGN PATENT DOCUMENTS

| | | |
|---|---|---|
| DE | 869 684 | 3/1953 |
| FR | 2 325 878 | 4/1977 |
| GB | 1 221 911 | 2/1971 |
| GB | 1 343 187 | 1/1974 |
| NL | 1001796 | 8/1997 |

\* cited by examiner

*Primary Examiner*—Kevin L Lee
(74) *Attorney, Agent, or Firm*—Wenderoth, Lind & Ponack, L.L.P.

(57) ABSTRACT

The present invention relates to a plant for storing gas under pressure. The plant includes at least one basin filled with a liquid, one or more pressure vessels located in the basin for storing the gas including interconnecting piping and connections to a gas supply and a gas discharge network, an anchoring system for supporting the vessels, a cover with a slanted surface on the underside for covering the basin which will lead any gas leak occurring in the basin towards and through a vent, and at least one gas detection equipment located in the vent. The plant is especially suitable for storing compressed gaseous hydrogen and can be connected to a hydrogen fuel replenishment system.

15 Claims, 4 Drawing Sheets

PLANT FOR STORING GAS UNDER PRESSURE

BACKGROUND OF THE INVENTION

The present invention relates to a plant for storing gas under pressure. The plant is especially suitable for storing compressed gaseous hydrogen and can be connected a hydrogen fuel replenishment system. The invention can also be applied to other gases such as hydrocarbon compounds which are commonly stored for industrial purposes, for vehicle refilling or for heating purposes.

Gaseous hydrogen is typically stored in pressurized cylindrical tanks (pressure vessels) of various sizes. These cylinders are either made of steel or consist of composite material comprising a gas tight liner (typically metal or plastic) and a fibrous wrapper. A storage installation consists typically of several individual vessels, which are interconnected with gas tubing (gas supply tubing as well as gas discharge tubing). The vessels are typically arranged in a rectangular pattern and supported by a metal frame which keeps the vessels in position relative to each other and supports the entire bundle or stack of vessels. The axes of the vessels are oriented either horizontally (in one or more stacks) or vertically (in one or more bundles).

A storage installation is typically placed outdoors on or above ground level, sometimes housed in a light steel construction, or in a more solid concrete construction. Alternatively, the installation can be buried in earth below ground level providing improved protection from external influences such as radiation from adjacent fires or damage caused by explosions. This alternative is rarely used as it makes inspection of the vessels and interconnecting piping very difficult and requires expensive measures to prevent corrosion (such as for example coating of the external tank surface and/or installation of a sacrificial anode for cathodic protection).

To overcome the difficulties related to inspection of buried vessels while maintaining the safety features, a system for storage of liquid or gaseous hydro-carbon compounds has been proposed in NL-C-1001796. The vessels are submerged in a basin filled with a liquid, for example, water. Thus, the vessels are protected from external influences such as fires and explosions while the vessel can be easily inspected by lowering the water level in the basin. Optionally, the top of the basin can be covered with wood, steel or concrete elements.

The above system however, makes gas leak detection difficult. The system will allow gas leaks to penetrate uncontrolled through the top of the basin, thus posing an inherent risk of undetected explosive gas mixtures.

SUMMARY OF THE INVENTION

The present invention seeks to provide a plant for storing gas under pressure, and the plant allows early detection of very small gas leaks, which improves the safety of the plant beyond the previously described underground storage system. The system also requires less area than conventional installations as most of the cover area can be used for other purposes, and the system will also result in a more even storage temperature for the gas.

In accordance with the present invention, these objectives are accomplished in a plant for storing gas under pressure where the plant comprises at least one basin 4 filled with a liquid 5, one or more pressure vessels 1 located in the basin for storing the gas including interconnecting piping and connections 2 to a gas supply and a gas discharge network, an anchoring system 3 for supporting the vessels, a cover with a slanted surface on the underside 6 for covering the basin which will lead any gas leak occurring in the basin towards and through a vent 7, and at least one gas detection unit 9 located in the vent.

A plant in accordance with the present invention has a number of advantages. The plant consists of a liquid filled basin similar to the system described in NL-C-1001796, but with a special cover and vent design that allows early detection of very small gas leaks and prevents build-up of gas, which improves the safety of the system featuring air exclusion, shielding from external influences (heat, impact) and horizontal explosion containment.

The plant according to the present invention has a safe and simple gas leak detection by guiding all gas escaping from vessels and interconnecting piping to a single vent.

Leak detection, especially in combination with uncovered outdoor installations, is a major challenge as small leaks quickly become diluted and are difficult to locate. Visual observation of submerged vessels by e.g. a video camera facilitates localization of even very small leaks. Other known underground installations will allow gas leaks to penetrate uncontrolled through the top of the basin thus posing an inherent risk and making leak detection more difficult.

As the entire underground space in the plant according to the present invention is filled with liquid, contact between escaping flammable gas and air only occurs in a predefined venting area equipped with a gas detector. This greatly reduces the risk of undetected explosive gas mixtures, which can occur in all other previously known systems.

The plant efficiently protects the storage vessels and gas piping from external influences such as radiation from adjacent fire, impact from external explosions and collisions with vehicles.

In the case of an explosion or acceleration of gas containing equipment due to the thrust caused by a large leak, the extent of damage inflicted on nearby buildings, equipment and human beings is greatly reduced compared to an above ground installation as the horizontal impact is suppressed by the basin walls and the surrounding earth masses. The area required for a given storage volume of gas is greatly reduced compared to above ground installations. The vent only covers a small fraction of the entire basin cover while the remaining cover can be used for other purposes. This will enable the installation of gas systems (e.g. for refueling of vehicles) even in densely populated urban areas with limited space available. For vehicle refueling purposes, the proposed system offers the advantage of more even temperature and less dependence on ambient conditions. This will allow a better defined and safer refueling process. In addition, an external heat exchanger can be employed to control the temperature of the liquid in the basin, which can be used to efficiently lower the gas temperature and allow shorter refueling times.

BRIEF DESCRIPTION OF THE DRAWINGS

The present invention will now be described by way of example and with reference to the accompanying drawings.

DETAILED DESCRIPTION OF THE INVENTION

Figure 1:
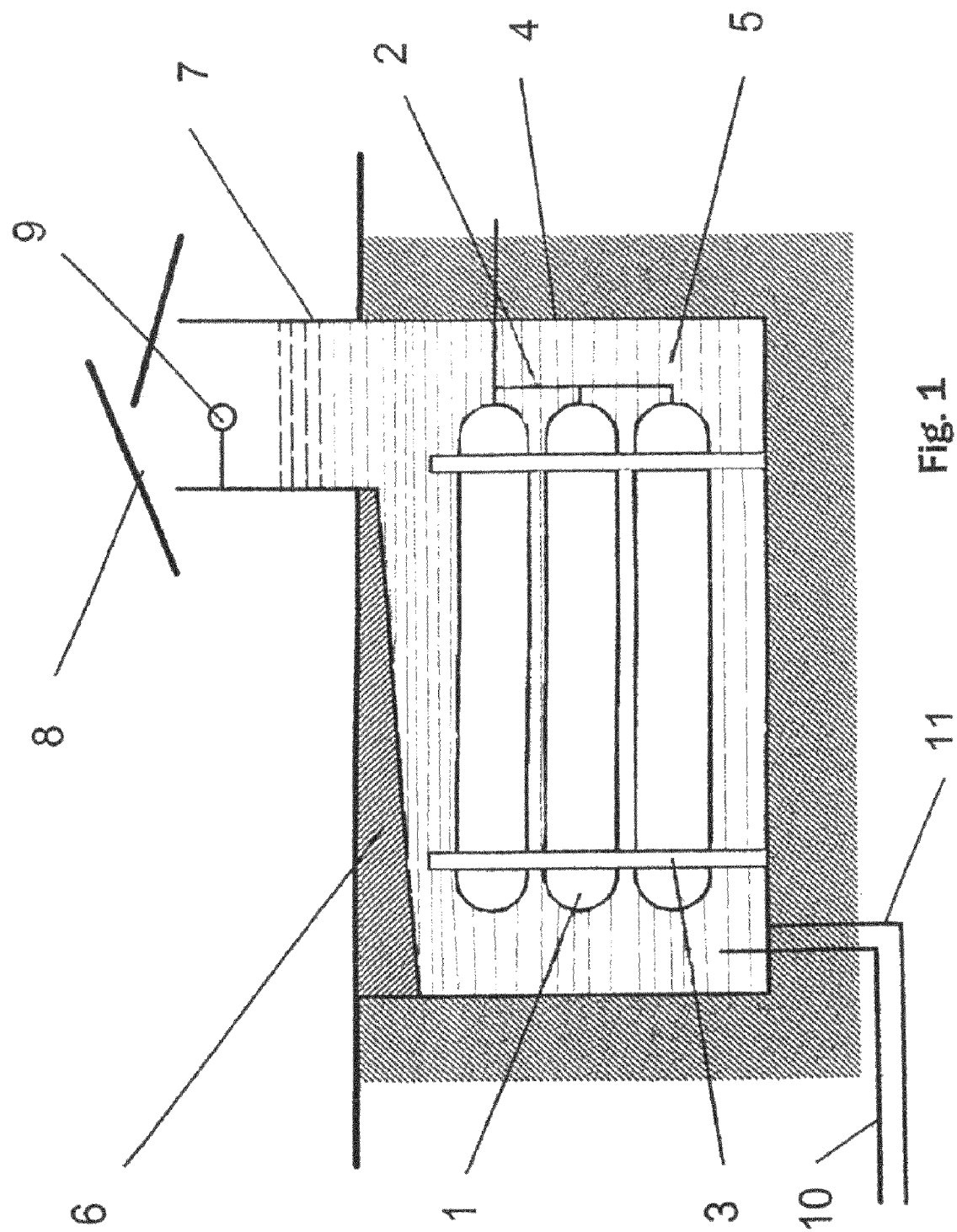
FIG. 1 is a plan view illustrating a plant in accordance with the present invention for safe underground storage of gaseous hydrogen or another gas.

The figures illustrate a hydrogen gas stored in one or more pressure vessels 1 including interconnecting piping 2, which are supported by an anchoring system 3. The pressure vessel arrangement (storage installation) is located in a basin 4 that is located partially or completely below ground level. The basin is filled with a liquid 5 (e.g. water) such that all vessels are completely submerged in the liquid and air is completely displaced from the underground space and gravity induced vertical transport of gas is promoted by the high difference in density between liquid and gas.

The basin is covered by a cover 6 with a slanted surface on the underside, which will lead any gas leak occurring in the basin towards a vent 7. The gap between the perpendicular walls of the basin and the cover is preferably water and gas tight to always secure water levels above ground level without water spillage.

Preferably, the cover of the basin is manufactured as a separate element, which can be removed from the basin to facilitate maintenance work in the basin or allow replacement or installation of additional pressure tanks. The cover and the seal between the slanted cover and the walls need to be water- and gastight to sustain the hydrostatic pressure of the liquid and ensure that potential gas leaks are transferred to the venting area without penetrating uncontrolled through the seal.

Figure 2:
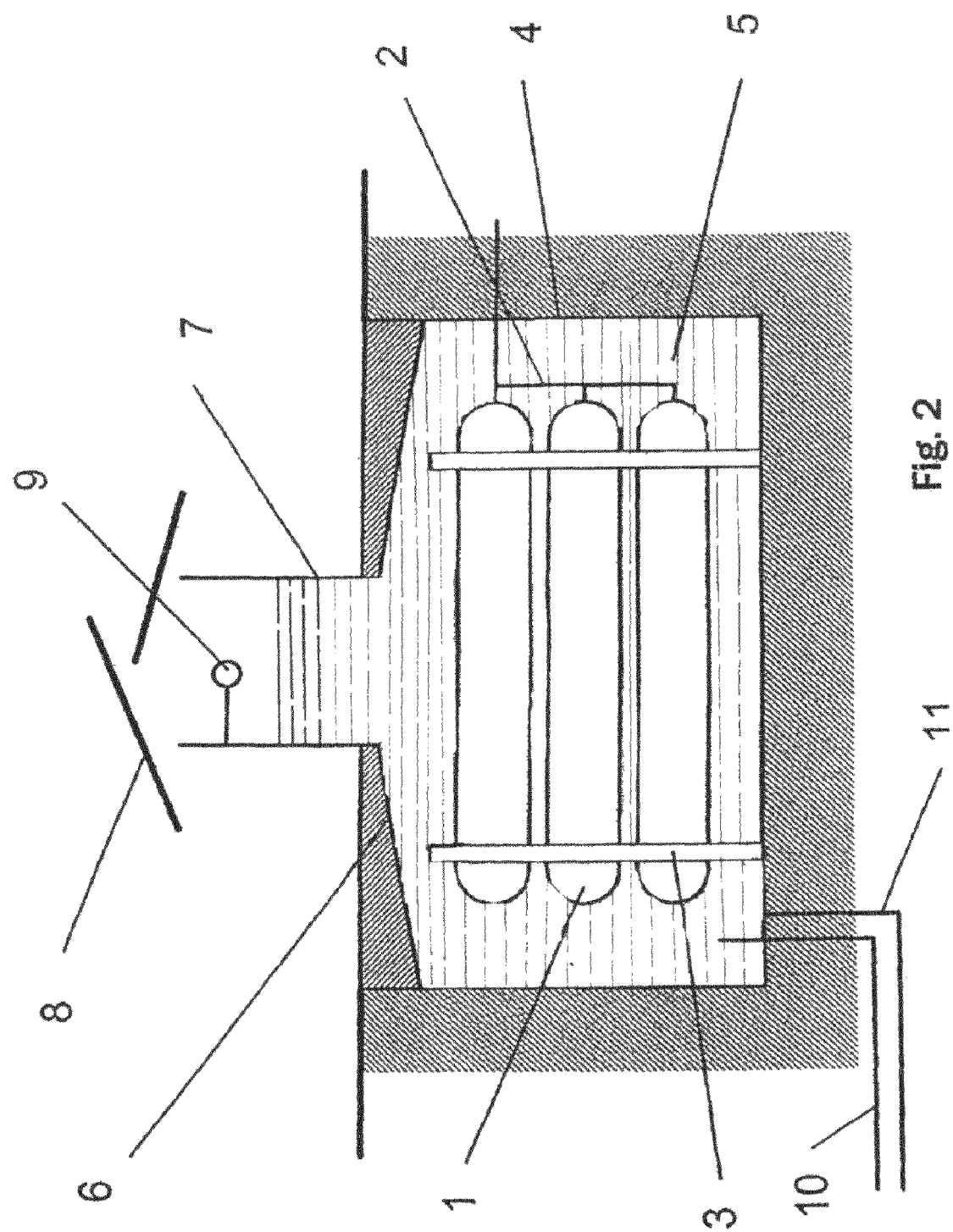
FIG. 2 is a plan view illustrating a plant in accordance with the present invention with central vent.
Figure 3:
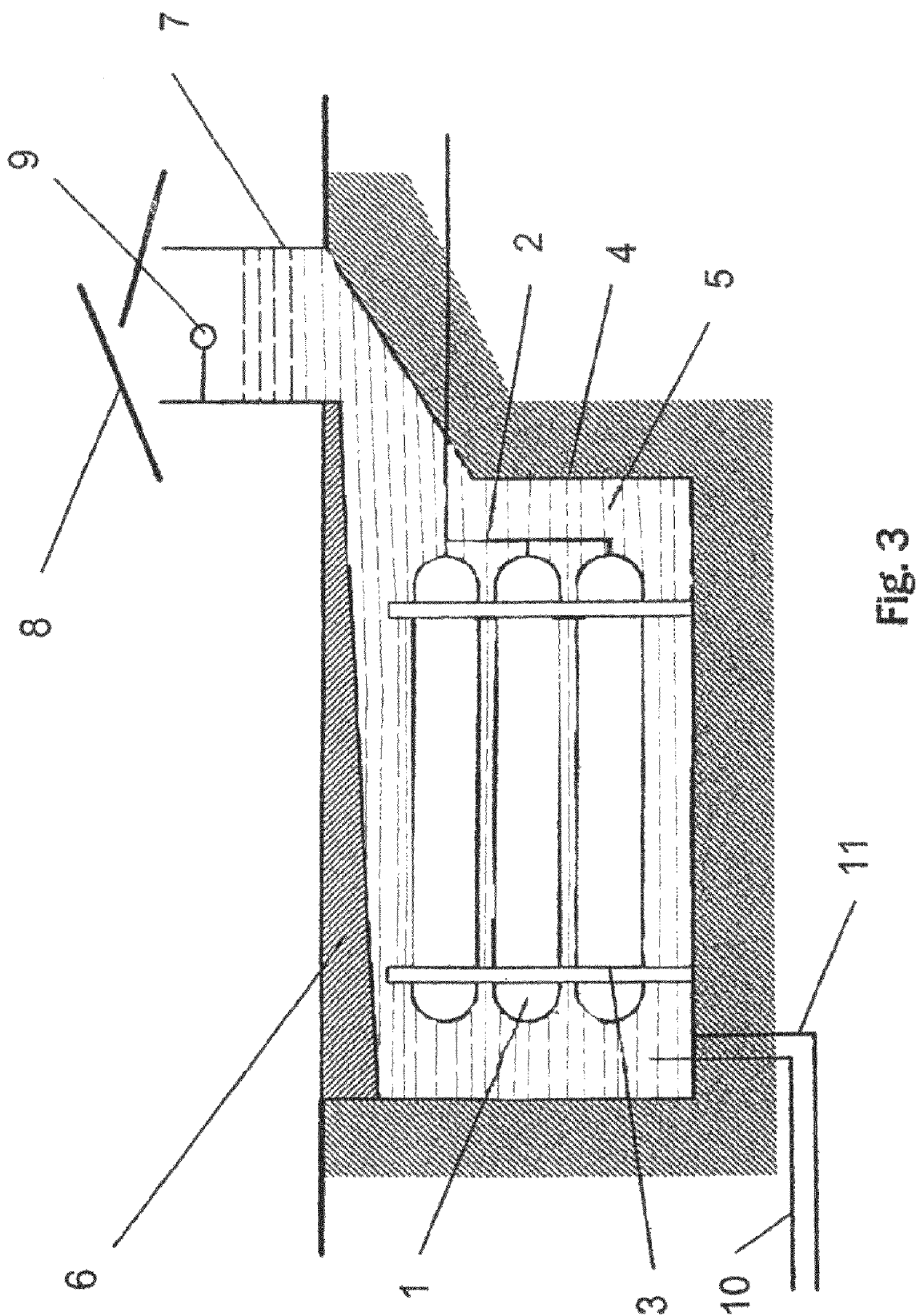
FIG. 3 is a plan view illustrating a plant in accordance with the present invention with remote vent.
Figure 4:
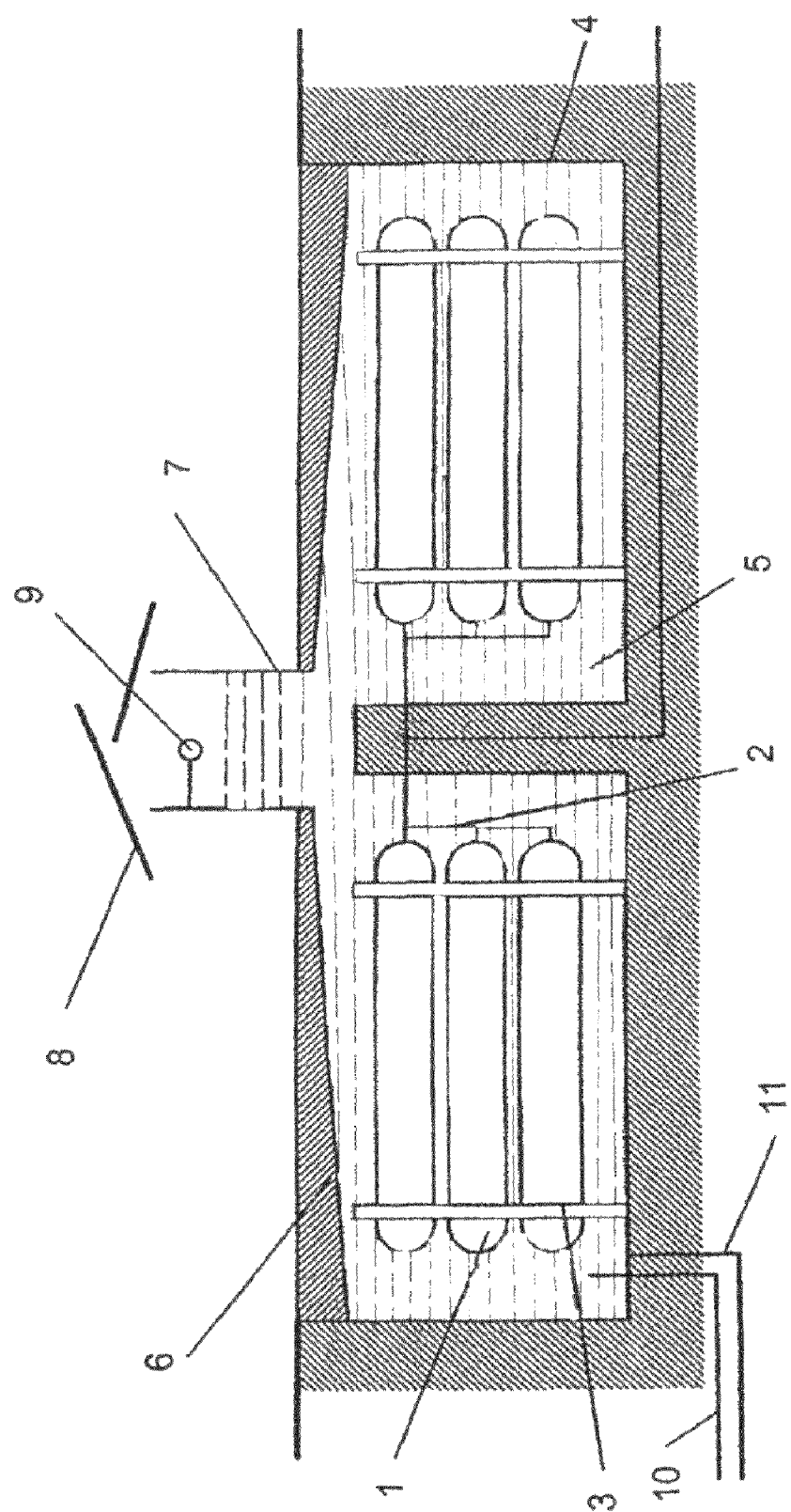
FIG. 4 is a plan view illustrating a plant in accordance with the present invention with a plurality of basins with common vent.

The slope of the cover (roof) 8 of vent 7 should be as low as possible to reduce the total height of the underground installation but steep enough to avoid any accumulation of gas in the basin. Large basins may require a two-directional slope to guide gas from the entire cross section of the basin to a single vent. The vent can be placed near one end or corner of the basin as illustrated in FIG. 1, centrally as depicted in FIG. 2, or remotely located from the basin as shown in FIG. 3. Optionally, a plurality of individual basins can be connected by a common vent as shown in FIG. 4.

The basin is created by combining a water-tight floor with a number of water-tight walls to contain the liquid. The level of the liquid in the basin is controlled by a combination of a liquid supply pipe and a discharge outlet which is preferably located at the lowest point of the basin floor. By installing an external liquid circulation loop which extracts the liquid and returns it by means of a pump, additional temperature control or conditioning or cleaning of the liquid can be achieved.

All gas piping and valves 2 are preferably located underneath the vent 7 to minimize the risk of a leak occurring far from the venting area and to facilitate an inspection. The pressure tanks and piping located in the basin can be inspected by remotely controlled video cameras. More thorough inspection and maintenance work can be performed by draining the liquid from the basin. The basin can be entered through the venting area or an especially designed manhole. Alternatively, inspection can be performed by using diving equipment, thus avoiding drainage of the liquid.

The vent is covered with a light roof 8 to protect the system from objects (e.g. leaves) and rain while ensuring gas to escape from the basin without accumulation under the cover.

Due to the closed design of the basin, the shape of the cover and the presence of the liquid all gas leaks from the vessels or interconnecting piping will be guided towards a single outlet in which it will be relatively straightforward to detect even very small amounts of gases. Gas detection equipment 9 can be located above or below the liquid surface and a variety of detection equipment can be applied, including optical or acoustic bubble sensors.

The main function of the slanted cover and vent system is to collect and guide potential (hydrogen) gas leaks to a safe location in order to protect the surroundings. The main advantages are that by collecting leaking gas in a single (or a small number of points), even small leaks can be discovered at an early stage independent of their location and protective measures can be taken. By filling the entire underground space with liquid and providing an unobstructed path for (hydrogen) gas bubbles to the vent, the build-up of gas pockets (=accumulation of gas below the surface) can be avoided completely. The design also allows for flaring of larger leaks if required. This should normally not be required, as e.g. hydrogen emitted to the atmosphere will under most circumstances due to its low density rise quickly to safe heights in the atmosphere where it will be diluted with air.

The invention claimed is:

1. A plant for storing gas under pressure, comprising:
a basin filled with a liquid, said basin including a vent;
a pressure vessel located in said basin for storing the gas, said pressure vessel including interconnecting piping and connections to a gas supply and a gas discharge network;
an anchoring system for supporting said pressure vessel;
a cover with a slanted bottom surface for covering said basin, said cover being configured to lead any gas leaking within said basin towards and through said vent; and
a gas detection unit located in said vent.

2. The plant according to claim 1, wherein said cover is separate and removable from said basin to facilitate maintenance work within said basin.

3. The plant according to claim 1, wherein said basin is filled with said liquid such that said pressure vessel is completely submerged in said liquid and air is completely displaced from said basin.

4. The plant according to claim 1, wherein said basin is located at least partially below ground level.

5. The plant according to claim 1, wherein said liquid is water.

6. The plant according to claim 1, wherein said vent is located near an end of said cover.

7. The plant according to claim 1, wherein said vent is located near a corner of said cover.

8. The plant according to claim 1, wherein said vent is located remotely from said basin.

9. The plant according to claim 1, wherein said vent is located centrally on said cover.

10. The plant according to claim 1, further comprising a plurality of basins, said basin being one of said plurality of basins, said vent comprising a common vent connecting said basins such that all of said basins communicate with said common vent.

11. The plant according to claim 1, wherein said piping and said connections are located underneath said vent.

12. The plant according to claim 1, further comprising a roof covering said vent.

13. The plant according to claim 1, wherein said roof is sloped.

14. The plant according to claim 1, wherein said gas detection unit comprises optical or acoustic bubble sensors.

15. The plant according to claim 1, further comprising a plurality of pressure vessels, said pressure vessel comprising one of said pressure vessels.

\* \* \* \* \*